United States Patent [19]
Burton

[11] Patent Number: 5,509,947
[45] Date of Patent: Apr. 23, 1996

[54] SUPPLEMENTAL SPARK ARRESTER AND SILENCER

[76] Inventor: John E. Burton, 707 W. Court St., Ludington, Mich. 49431

[21] Appl. No.: 222,538

[22] Filed: Apr. 4, 1994

[51] Int. Cl.$^6$ .................................................. B01D 45/00
[52] U.S. Cl. .................. 55/276; 55/385.3; 55/463; 55/DIG. 20; 55/DIG. 30
[58] Field of Search .................................. 55/276, 385.3, 55/434, 463, DIG. 14, DIG. 20, DIG. 21, DIG. 30

[56] References Cited

U.S. PATENT DOCUMENTS

| | | | |
|---|---|---|---|
| 970,397 | 9/1910 | Rush | 55/DIG. 20 |
| 1,171,530 | 2/1916 | Michaels | 55/DIG. 20 |
| 1,811,762 | 6/1931 | Schnell | 55/DIG. 21 |
| 2,524,588 | 10/1950 | Bechtel | 55/DIG. 30 |
| 3,407,575 | 10/1968 | Krizman . | |
| 3,675,398 | 7/1972 | Giarrizzo | 55/DIG. 30 |
| 3,757,892 | 9/1973 | Raudman, Jr. | 55/276 |
| 3,898,064 | 8/1975 | Tao et al. | 55/DIG. 21 |
| 4,033,428 | 7/1977 | Wennerstrom | 55/276 |
| 4,113,051 | 9/1978 | Moller | 55/276 |
| 4,318,720 | 3/1982 | Hoggatt | 55/276 |
| 4,574,913 | 3/1986 | Fukuda | 55/276 |

*Primary Examiner*—C. Scott Bushey
*Attorney, Agent, or Firm*—Warner Norcross & Judd

[57] ABSTRACT

A supplemental exhaust system for use with an off-road vehicle. The system includes a supplemental silencer and/or a spark arrester contained within a flexible outer shell. The outer shell mounts directly to the housing of an existing exhaust system silencer. The exhaust gases exiting the existing silencer are directed into the supplemental silencer and spark arrester by an inlet chamber having an oversized inlet opening.

14 Claims, 2 Drawing Sheets

SUPPLEMENTAL SPARK ARRESTER AND SILENCER

FIELD AND BACKGROUND

Off road vehicles (ORVs) as defined for the purposes of this invention consist of off-road motorcycles, three and four wheel all terrain vehicles (ATVs), dune buggies, two and four wheel drive off-road trucks, amphibious vehicles (water to land, and back) and hovercraft. The invention could be adapted for use on any of these ORVs, however, for the purposes of discussion will be described as sued on the racing type of off-road motorcycle called motocross bikes. The exhaust system on a motocross bike's internal combustion engine typically consists of an exhaust pipe and a silencer which are designed as a customized system to insure maximum power output from each different model engine. Although the silencers provided by the original equipment manufacturer reduce engine noise output to a degree, this reduced sound level remains unacceptably high for use near residential areas. Many motocross bikes, which were originally designed for race use on private courses, are used for non-competitive "trail riding" on public and private lands that are near residential areas. For use on public lands. The Department of Natural Resourses (DNR) requires that ORVs not exceed specified noise levels. For example, in the case of motorcycles manufactured after Jan. 1, 1986 the maximum noise level is 94 decibels (dba) when measured per test procedure SAE J 1287. Typically a motocross bike with a standard silencer will yield over 100 dba under this same test. Additionally, the DNR requires that all off-road vehicles be equipped with a U.S. Forest service approved spark arrester that captures at least 80 percent of carbon particulate carried by the exhaust gases to minimize the risk of exhaust spark fires.

Original equipment manufactures such as Honda and Kawaski have never been required to produce motocross bikes pre-equiped to meet the DNRs spark arrester and noise requirements because their designed use is for racing on private lands, Thus, aftermarket manufactures have been left to produce spark arrester and silencer products to meet the DNR regulations.

However, the two greatest obstacles to designing an aftermarket silencer and/or spark arrester product are first fitting the product onto the multitude of uniquely shaped exhaust systems for each motorcycle brand, model size and model year and second, maintaining adequately sized exhaust flow corridors through the product so it will not hinder performance characteristics of each uniquely designed exhaust system. Over the last two decades there have been over fifteen different brands of motocross bikes sold in the United States and each brand has typically offered two to four different model sizes. With the exhaust system configuration of each model size changing from year to year, hundreds of different exhaust systems have resulted.

As a consequence, aftermarket manufacturers have only been able to produce a select number of spark arrester and silencer products for the most popular and late model brands. Of the available aftermarket replacement silencers and combination silencer and spark arresters, few are designed to produce adequate silencing: most are designed to modify engine performance. Thus for a large majority of motocross bikes in existence, no product is commercially available to adequately silence or capture sparks for trail riding purposes.

SUMMARY OF THE INVENTION

This invention provides a solution to the problems of fitting a silencer onto a multitude of exhaust systems and maintaining exhaust flow characteristics for peak engine performance. The apparatus, a supplemental silencer and spark arrester, mounts onto the existing silencer with various universal attachment means. Several unique and integral features are encompassed in this invention;

First, the idea of using an existing silencer in combination with a supplemental silencer and spark arrester means is unique for all that is presently available are complete replacement systems. This concept offers the following advantages:

since the existing silencer is designed with an appropriate air flow restriction level and since the subject invention is designed with less restrictive exhaust flow corridors than the existing silencer, the overall effect of the combination is nearly the same as the original. Consequently, engine performance is not significantly altered. For instance, a typical 250 cc two stroke motocross engine may have an exhaust outlet area of 1.0 square inch, the subject supplemental silencer and spark arrester for this size engine may typically have exhaust flow corridors throughout that are no less than 200 percent of this of this area or 2.0 square inches.

a cost effective and efficient means of silencing is achieved since the existing silencer's contribution is still utilized and thus less noise reduction material is required.

Second, the various attachment means are unique in that they allow the supplemental silencer and spark arrester apparatus to fit the large majority of existing silencers, thereby providing a commercially available product for the large majority of existing motocross bikes. The attachment means also minimize the number of differently sized models needed which reduces manufactured cost.

Third, both the methods used for silencing and the spark arrester portion are unique in that they are integral to each other and depart from existing methods used to achieve these same goals. For instance, existing silencer devices use perforated tube, fiberglass and an aluminum outer shell. The silencing means employed in the invention also uses perforated tube and fibrous sound absorption material but employs the use of conical sections to both reflect and reduce the noise as well as an elastomeric outer shell which serves as additional sound absorption material. The spark arrester means utilizes these same conical sections as a simple means to capture carbon particles that is unlike existing devices which helically spin the exhaust gases to separate out the carbon particulate.

Fourth, the elastomeric outer shell of the apparatus, made out of a material such as ethylene acrylic or any other elastomeric material able to withstand temperatures in excess of 200 degrees fahrenheit and chemically resistant to exhaust byproducts, is new and uniquely different from existing product that is made of steel or aluminum and offers the following advantages:

It provides additional sound absorption

It conforms easily for a universal type attachment to many different silencer configurations It does not conduct heat like metals which can cause burns It does not dent or corrode

BRIEF DESCRIPTION OF THE DRAWINGS

FIG. 2 is showing a longitudinal sectional view of the supplemental silencer and spark arrester portion of the invention along with a partial view of the silencer it is attached to.

DETAILED DESCRIPTION OF THE DRAWINGS

Figure 1B:
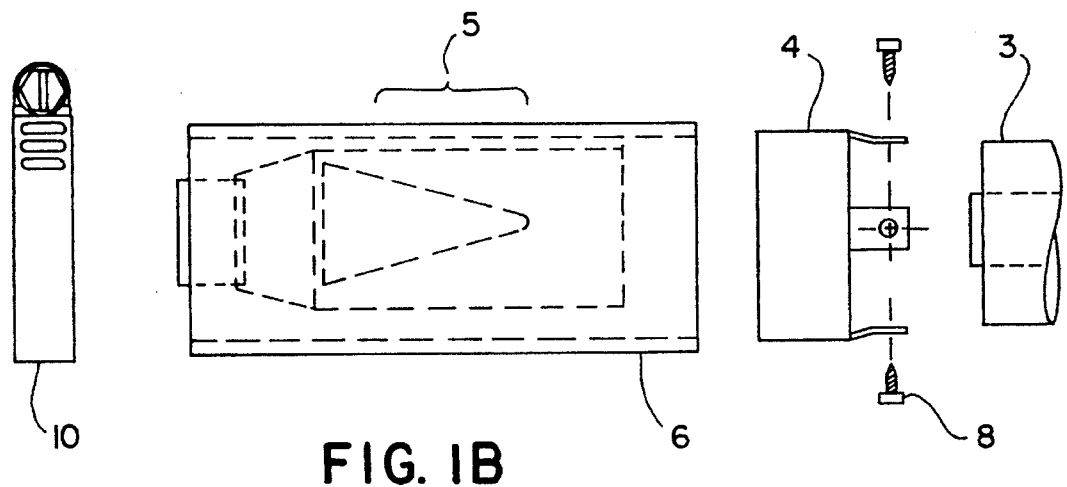
FIG. 1B is a close up explosion of an adapter type attachment means.
Figure 1A:
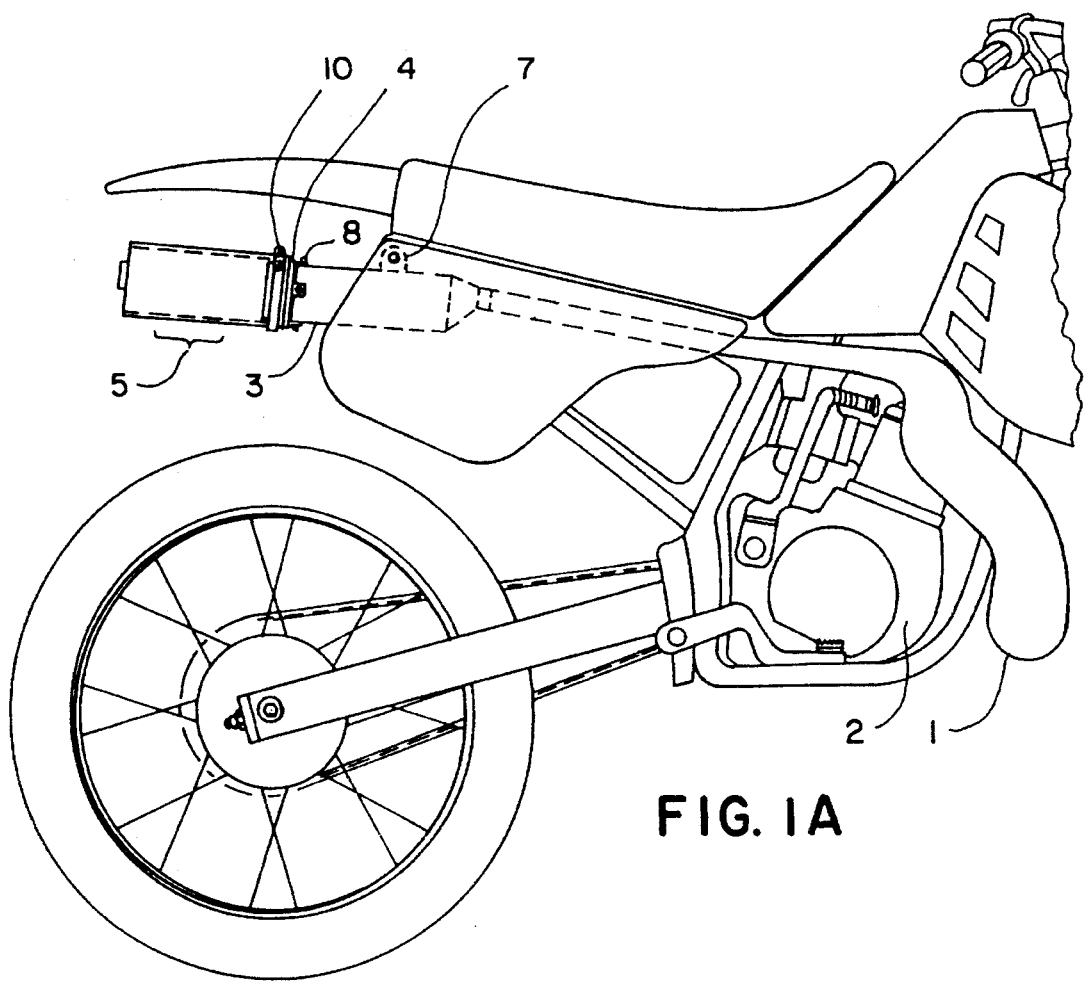
FIG. 1A is showing a side view of the invention mounted on to the silencer of a typical motocross bike.
Figure 2:
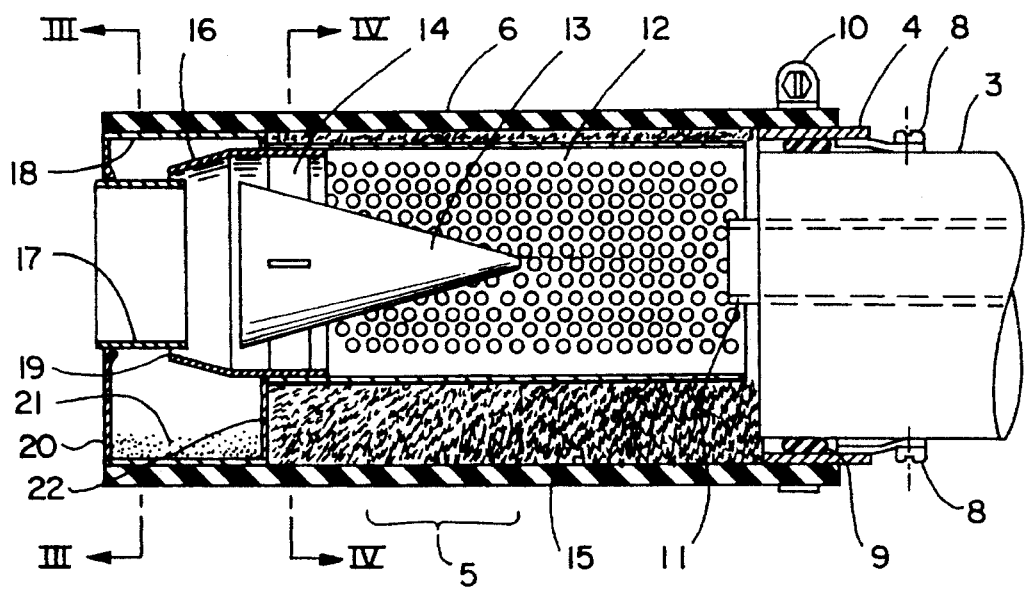

The drawings show an apparatus in accordance with the invention mounted onto the silencer of a typical, somewhat older motocross bike such as a 1987 Honda CR 250. Such a motorcycle includes an internal combustion engine 2, a silencer 3 and an exhaust pipe 1 that connects the exhaust outlet of the internal combustion engine 2 to the silencer 3 as shown in FIG. 1. Typically the silencer has a mounting bracket 7 set back from the end of the silencer 3 which in combination with other bracketry (not shown) on the exhaust pipe 1 support entire exhaust system. An adapter piece 4 having a cross-sectional profile that will fit inside the combination supplemental silencer and spark arrester 5 and four tabs that are bent as needed to fasten directly to the sheet metal shell of the silencer 3 using screws 8. A gasketing means 9 would be used in conjunction with the adapter piece 4 to form a seal which prevents the passage of exhaust gases back through the adapter piece 4. The gasket 9 shown is pressed in between the inside of the adapter piece and the outside of the silencer 3 and wraps around its entire circumference. The combination supplemental silencer and spark arrester 5 has an elastomeric shell 6 that is fitted over the adapter piece 4 and secured to it by a band clamp 10 as shown in FIG. 2. The adapter piece 4 or gasketing 9 would not be needed provided the elastomeric shell 6 can conform and be directly band clamped to the the silencer 3 which is the preferred attachment.

Figure 3:
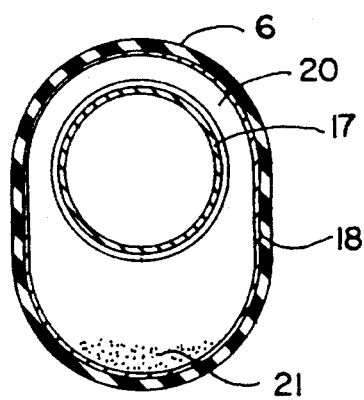
FIG. 3 is showing a sectional view along lines 3—3 in FIG. 2.
Figure 4:
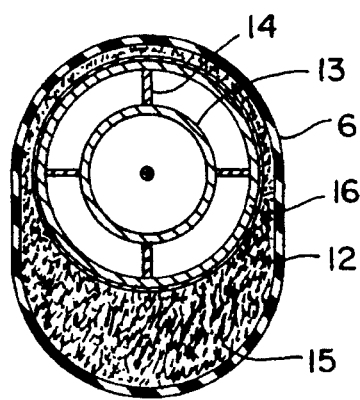
FIG. 4 is showing a sectional view along lines 4—4 in FIG. 2.

The combination supplemental silencer and spark arrester 5 is shown in detail in FIGS. 2, 3 and 4. Inside of the combination supplemental silencer and spark arrester 5 is a cylindrically shaped inlet chamber 12 which is open at both ends and perforated with holes. Exhaust gases and sound pressure waves enter the inlet chamber 12 from the outlet 11 of the silencer 3.

As the sound pressure waves travel down the inlet chamber 12 they pass through the perforated holes and are absorbed by both fibrous sound absorbing material 15 and the elastomeric outer shell 6. The conical portion 13, supported centrally within the chamber by straight fins 14, acts as a reflective surface which further assists directing the sound pressure waves through the described perforated holes for absorption. Carbon particles that may be present in the exhaust gases are directed radially outward by the conical portion 13. Beyond the conical portion 13 is a truncated conical portion 16 and an outlet tube 17. The sound pressure waves are further minimized as they pass through the truncated conical portion 16 and out the outlet tube 17 for they have the inverse effect of a megaphone. The exhaust gases flow over the conical portion 13 and through the outlet tube 17 with minimal restriction due to the large exhaust flow corridors provided. The carbon particles, however, due to their mass and momentum cannot make the direction change necessary to exit through the outlet tube 17 but are instead deflected off the inside of the truncated conical portion 16 and through a gap 19 between the two. Once through this gap 19 the carbon particles deflect off a wall 20 and are trapped in the bottom of a dead air space 21. Pieces 18 and 22 complete the enclosure that creates the dead air space and provide support to adjacent pieces.

The drawings depict a conical portion 13 that has a 30 degree included angle and an outer diameter nearly equivalent to the outlet tube 17. The area created for exhaust flow between the conical portion 13, truncated conical portion 16, and the outlet tube 17 are shown to be proportioned 200 percent or greater than that of the silencer's outlet 11 area as preferred. All of the internal pieces as well as the adapter piece 4 in the drawing are of sheet metal construction and are joined by welding.

It is to be understood that various modifications may be made by those skilled in the art without departing from the spirit and scope of the appended claims. For instance, the conical portions could be instead parabolically shaped, angles and exhaust flow areas altered, or a different spark arrester means substituted in place of the one described.

I claim:

1. A supplemental silencer for use with an existing silencer having a housing comprising:

a silencer means for reducing noise generated by an exhaust stream exiting the exhaust outlet of the existing silencer;

an elastomeric outer shell around said silencer means and secured directly to the housing of the existing silencer such that said exhaust stream is forced to flow from the exhaust outlet through said silencer means, said shell being sufficiently pliable to conform to a variety of differently shaped housings; and a securing means for securing said shell to the housing.

2. The silencer of claim 1, wherein said silencer means includes a sound absorbing material lining said shell; and wherein an inlet chamber surrounds said exhaust outlet of said existing silencer which allows a portion of said exhaust stream to pass into said sound absorbing material.

3. The silencer of claim 2, wherein said inlet chamber is supported within said shell and is substantially larger than the exhaust outlet such that said inlet chamber will surround a range of differently located and sized exhaust outlets.

4. The silencer of claim 3, further comprising a spark arrester secured within said shell.

5. The silencer of claim 3, wherein said securing means includes a band clamp.

6. A supplemental silencer and spark arrester for use in conjunction with a primary exhaust system having a housing and an exhaust outlet, comprising:

a spark arrester means for removing particulate matter from an exhaust stream exiting the primary exhaust system;

a silencing means for reducing noise generated by the exhaust stream exiting the primary exhaust system; and an elastomeric outer shell housing said spark arrester means and said silencing means, said shell including means for mounting said shell directly to the housing of the primary exhaust system, said shell being sufficiently pliable to allow said shell to conform to differently shaped housings.

7. The silencer and spark arrester of claim 6, further comprising an inlet chamber for directing the exhaust stream through said silencing means and said spark arrester means, said inlet chamber having an open end substantially larger than and surrounding the exhaust outlet of the primary exhaust system.

8. The silencer and spark arrester of claim 7, wherein said inlet chamber is cylindrically shaped.

9. The silencer and spark arrester of claim 8, further comprising a securing means for securing said outer shell to the housing of the primary exhaust system.

10. The silencer and spark arrester of claim 9, wherein said securing means is a band clamp.

11. The silencer and spark arrester of claim 10, wherein said outer shell is manufactured from rubber.

12. A supplemental exhaust system for use with a primary exhaust system having a housing and an exhaust outlet, comprising:

an exhaust treatment means for treating an exhaust stream flowing from the exhaust outlet of the primary exhaust system;

an elastomeric outer shell surrounding and securing said exhaust treatment means, said outer shell being adapted for mounting directly to the housing of the primary exhaust system.

13. A supplemental exhaust system for use with a primary exhaust system having a housing and an outlet, comprising:

an exhaust treatment means for treating an exhaust stream flowing from said outlet of said primary exhaust system, said exhaust treatment means includes a conical portion axially aligned with an inlet chamber having an open end, said conical portion tapering downwardly from a first diameter toward said open end, said treatment means further including an outlet tube spaced apart from and axially aligned with said conical portion, said outlet tube having a diameter substantially equal to said first diameter; and a pliable outer shell surrounding and securing said exhaust treatment means, said outer shell being adapted for mounting directly to the housing of the primary exhaust system.

14. The exhaust system of claim 13, wherein said exhaust treatment means further includes a hollowed frustum having a small diameter end and a large diameter end, said frustum tapering downwardly away from said open end, said frustum being axially aligned with and partially overlapping said outlet tube at said small diameter end, said small diameter end having a diameter substantially larger than said first diameter such that an annular gap is defined between said outlet tube and said small diameter end of said frustum.

* * * * *